(12) United States Patent
Deng

(10) Patent No.: US 10,663,817 B2
(45) Date of Patent: May 26, 2020

(54) ARRAY SUBSTRATE COMPRISING A BLOCKING ELEMENT STACKED ON A THIN FILM TRANSISTOR AND FIRST AND SECOND SHIELDING ELECTRODES ON A SIDE OF A DATA LINE FACING AWAY FROM A FIRST SUBSTRATE

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Zhuming Deng, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 338 days.

(21) Appl. No.: 15/742,392

(22) PCT Filed: Dec. 6, 2017

(86) PCT No.: PCT/CN2017/114703
§ 371 (c)(1),
(2) Date: Jan. 5, 2018

(87) PCT Pub. No.: WO2019/095460
PCT Pub. Date: May 23, 2019

(65) Prior Publication Data
US 2019/0155117 A1    May 23, 2019

(30) Foreign Application Priority Data
Nov. 17, 2017 (CN) .......................... 2017 1 1142511

(51) Int. Cl.
*G02F 1/1362* (2006.01)
*G02F 1/1335* (2006.01)
(Continued)

(52) U.S. Cl.
CPC .. *G02F 1/136209* (2013.01); *G02F 1/133512* (2013.01); *G02F 1/136286* (2013.01);
(Continued)

(58) Field of Classification Search
CPC .......... G02F 2001/13606; G02F 2001/136218; G02F 2001/13775; G02F 1/137; G02F 1/1676; G02F 2001/13398
See application file for complete search history.

(56) References Cited

U.S. PATENT DOCUMENTS 9,638,949 B1 * 5/2017 Kim ...................... G06F 3/0416
2005/0243235 A1 11/2005 Lee
(Continued)

FOREIGN PATENT DOCUMENTS

| CN | 102169256 A | 8/2011 |
|----|-------------|--------|
| CN | 102495504 A | 6/2012 |
| CN | 107121864 A | 9/2017 |

*Primary Examiner* — Paul C Lee
(74) *Attorney, Agent, or Firm* — Hemisphere Law, PLLC; Zhigang Ma

(57) ABSTRACT

An array substrate, a liquid crystal display panel and a liquid crystal display apparatus are provided. The array substrate comprising first substrate; thin film transistor and data line are positioned on first substrate, data line electrically connecting with source or drain of thin film transistor; blocking element stacking positioned on thin film transistor; first shielding electrode and second shielding electrode located on lateral side of data line which away first substrate, vertical projections of first shielding electrode and second shielding electrode on first substrate are respectively covering data lines, thin film transistor positioned between first shielding electrode and second shielding electrode; trans- (Continued)

verse electrode connecting between first shielding electrode and second shielding electrode, transverse electrode located on lateral side of thin film transistor which away first substrate, and at least partial of transverse electrode is stacked positioned on blocking element.

17 Claims, 5 Drawing Sheets

(51) Int. Cl.
G02F 1/1676 (2019.01)
G02F 1/137 (2006.01)

(52) U.S. Cl.
CPC ...... *G02F 1/1676* (2019.01); *G02F 1/136213* (2013.01); *G02F 1/136227* (2013.01); *G02F 2001/13775* (2013.01); *G02F 2001/136218* (2013.01); *G02F 2001/136222* (2013.01)

(56) References Cited

U.S. PATENT DOCUMENTS

| | | | |
|---|---|---|---|
| 2008/0111138 A1* | 5/2008 | Lin | G02F 1/136213 257/79 |
| 2015/0198851 A1* | 7/2015 | Park | G02F 1/134309 349/46 |
| 2016/0104722 A1* | 4/2016 | Woo | H01L 27/124 257/72 |
| 2016/0202575 A1* | 7/2016 | Youk | G02F 1/134336 349/110 |
| 2016/0202581 A1* | 7/2016 | Yu | G02F 1/134309 257/72 |
| 2016/0202582 A1* | 7/2016 | Paek | G02F 1/136209 349/43 |
| 2016/0209712 A1* | 7/2016 | Lee | G02F 1/134309 |
| 2016/0274410 A1* | 9/2016 | Jung | G02F 1/136209 |
| 2016/0282682 A1* | 9/2016 | Kim | G02F 1/13624 |

* cited by examiner

ARRAY SUBSTRATE COMPRISING A BLOCKING ELEMENT STACKED ON A THIN FILM TRANSISTOR AND FIRST AND SECOND SHIELDING ELECTRODES ON A SIDE OF A DATA LINE FACING AWAY FROM A FIRST SUBSTRATE

RELATED APPLICATIONS

The present application is a National Phase of International Application Number PCT/CN2017/114703, filed Dec. 6, 2017, and claims the priority of China Application 201711142511.7, filed Nov. 17, 2017.

FIELD OF THE DISCLOSURE

The disclosure relates to a display technical field, and more particularly to an array substrate, a liquid crystal display panel and a liquid crystal display apparatus.

BACKGROUND

Polmer Stabilized Vertically Aligned (PSVA) module liquid crystal display panel is using the vertical electric field in vertical direction to driving liquid crystal molecule of the glass substrate which perpendicular positioned, such that forming copolymer stable and perpendicular arrangement on the liquid crystal display panel. In this module liquid crystal display panel, it's will be black display status without applying voltage; while applying a certain voltage, the liquid crystal molecular of the crystal liquid display panel is turn to horizontal direction. In this module liquid crystal display panel will be white display status. Currently, in order to avoid the light leakage of the liquid crystal display panel caused by curving black matrix, the existing PSVA module liquid crystal display panel is formed a shielding electrode on the data line, the shielding electrode effective reduces the light leakage of the curving liquid crystal display panel. However, the shielding electrode totally covering the data line such that the shielding electrode is easily affected by high/low potential signal of the data line. Therefore, the common electrode of the shielding electrode and the color filter has voltage difference and caused the light leakage of the liquid crystal display panel.

In existing technology, a transverse electrode is disposed between two adjacent shielding electrodes, the transverse electrode is electrically connecting to the two adjacent shielding electrodes so that decreases voltage difference between each shielding electrodes, and keep stable voltage of the shielding electrode. Further, the transverse electrode is positioned between the adjacent pixel electrodes, the transverse electrode will bend toward to a pixel electrode for avoiding the thin film transistor positioned between the adjacent pixel electrodes such that pass through the metal gap between the pixel electrode and thin film transistor. Actually, the transverse electrode is too closed to the pixel electrode, it is easy to form ITO residue between pixel electrode and the transverse electrode while forming the pixel electrode and the transverse electrode by physical vapor deposition and etching indium tin oxide conducting layer. It causes the short circuit between the pixel electrode and the transverse electrode and effect normal working of pixel electrode.

SUMMARY

A technical problem to be solved by the disclosure is to provide an array substrate, a liquid crystal display panel and a liquid crystal display apparatus. It could solve the problem that the short circuit between the pixel electrode and the transverse electrode and effect normal working of pixel electrode, because of the transverse too closed to the pixel electrode for avoiding thin film transistor.

An objective of the disclosure is achieved by following embodiments. In particular, an array substrate, comprising
a first substrate;
a thin film transistor and a data line positioned on the first substrate, the data line electrically connecting with a source or a drain of the thin film transistor;
a blocking element stacking are positioned on the thin film transistor;
a first shielding electrode and a second shielding electrode located on a lateral side of the data line which away the first substrate, vertical projections of the first shielding electrode and the second shielding electrode on the first substrate are respectively covering the data lines, the thin film transistor positioned between the first shielding electrode and the second shielding electrode;
a transverse electrode connecting between the first shielding electrode and the second shielding electrode, the transverse electrode located on a lateral side of the thin film transistor which away the first substrate, and at least partial of the transverse electrode is stacked positioned on the blocking element.

In an embodiment, the array substrate further comprises color resistance blockers, part of the color resistance blockers are formed on surface of the first substrate for imaging color of image, part of the color resistance blockers are stacking positioned on the thin film transistor to form the color resistance blocker.

In an embodiment, the blocking element comprises a first color resistance blocker and a second color resistance blocker, the first color resistance blocker and the second color resistance blocker are sequentially stacking positioned on the thin film transistor, vertical projection of the first color resistance blocker on the first substrate is larger than the second color resistance blocker.

In an embodiment, height of the first color resistance blocker is larger than the second color resistance blocker.

In an embodiment, the array substrate further comprising an auxiliary electrode a pixel electrode positioned on the first substrate, at least partial of vertical projection of the auxiliary electrode on the first substrate is located between the data line and the pixel electrode, and the auxiliary electrode is for decreasing effect of the pixel electrode by the data line.

In an embodiment, the thin film transistor comprising a scan line positioned on the first substrate, vertical projection of the transverse electrode on the first substrate without intersecting the scan line and the auxiliary electrode.

In an embodiment, the thin film transistor comprising a grid and a grid insulating layer are sequentially positioned on the first substrate, the grid insulating layer is covering the grid, at least partial of the transverse electrode is stacking positioned on the grid insulating layer, the grid insulating layer is for interval the transverse electrode and the grid.

In an embodiment, the thin film transistor further comprising the source, the drain and an active layer electrically connecting with the source and the drain, the source, the drain and the active layer is located in an enclosed space formed by the blocking element and the grid insulating layer for interval the transverse electrode and the source, the drain and the active layer.

According to another aspect of the disclosure, the disclosure further provides a liquid crystal display panel. The liquid crystal display panel, comprising a second substrate, a common electrode, a liquid crystal layer and an array substrate, the array substrate comprising a first substrate;

a thin film transistor and a data line are positioned on the first substrate, the data line electrically connecting with a source or a drain of the thin film transistor;

a blocking element stacking positioned on the thin film transistor;

a first shielding electrode and a second shielding electrode are located on a lateral side of the data line which away the first substrate, vertical projections of the first shielding electrode and the second shielding electrode on the first substrate are respectively covering the data lines, the thin film transistor positioned between the first shielding electrode and the second shielding electrode;

a transverse electrode connecting between the first shielding electrode and the second shielding electrode, the transverse electrode located on a lateral side of the thin film transistor which away the first substrate, and at least partial of the transverse electrode is stacked positioned on the blocking element;

wherein the second substrate is correspondingly positioned to the first substrate, the common electrode is positioned on a surface of the second substrate which facing to the first substrate, the common electrode is electrically connecting to the first shielding electrode and the second shielding electrode, the liquid crystal layer is positioned between the pixel electrode and the common electrode, and changing liquid crystal molecular deflection of the liquid crystal layer according to voltage difference between the pixel electrode and the common electrode.

In an embodiment, the array substrate further comprises color resistance blockers, part of the color resistance blockers are formed on surface of the first substrate for imaging color of image, part of the color resistance blockers are stacking positioned on the thin film transistor to form the color resistance blocker.

In an embodiment, the blocking element comprises a first color resistance blocker and a second color resistance blocker, the first color resistance blocker and the second color resistance blocker are sequentially stacking positioned on the thin film transistor, vertical projection of the first color resistance blocker on the first substrate is larger than the second color resistance blocker.

In an embodiment, height of the first color resistance blocker is larger than the second color resistance blocker.

In an embodiment, the array substrate further comprising an auxiliary electrode a pixel electrode positioned on the first substrate, at least partial of vertical projection of the auxiliary electrode on the first substrate is located between the data line and the pixel electrode, and the auxiliary electrode is for decreasing effect of the pixel electrode by the data line.

In an embodiment, the thin film transistor comprising a scan line positioned on the first substrate, vertical projection of the transverse electrode on the first substrate without intersecting the scan line and the auxiliary electrode.

In an embodiment, the thin film transistor comprising a grid and a grid insulating layer are sequentially positioned on the first substrate, the grid insulating layer is covering the grid, at least partial of the transverse electrode is stacking positioned on the grid insulating layer, the grid insulating layer is for interval the transverse electrode and the grid.

In an embodiment, the thin film transistor further comprising the source, the drain and an active layer electrically connecting with the source and the drain, the source, the drain and the active layer is located in an enclosed space formed by the blocking element and the grid insulating layer for interval the transverse electrode and the source, the drain and the active layer.

According to another aspect of the disclosure, the disclosure further provides a liquid crystal display apparatus. The liquid crystal display apparatus, comprising a backlight module and a liquid crystal display panel according to claim 9, the backlight module is positioned on a side of non-display surface of the liquid crystal display panel for providing backlight source to display image on the liquid crystal display panel.

The advantageous of this disclosure is: the blocking element enhances the partial height of the transverse electrode which pass the thin film transistor, and increases vertical distance between the transverse electrode and the thin film transistor and avoid effect between the transverse electrode and the thin film transistor. Therefore, stably connecting the first shielding electrode and the second shielding electrode, and reduces effect to the first shielding electrode and the second shielding electrode by the high/low potential signal of the data line. Further, the transverse electrode in horizontal direction does not need to bend for avoid the thin film transistor, such that has more horizontal distance between the transverse electrode and the pixel electrode. It avoids ITO residue of edge of the pixel electrode contacting the transverse electrode and short circuit of the pixel electrode and the transverse electrode, and not effect normal working of the pixel electrode, highly productively yield, and saving produce costs.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

Figure 1:
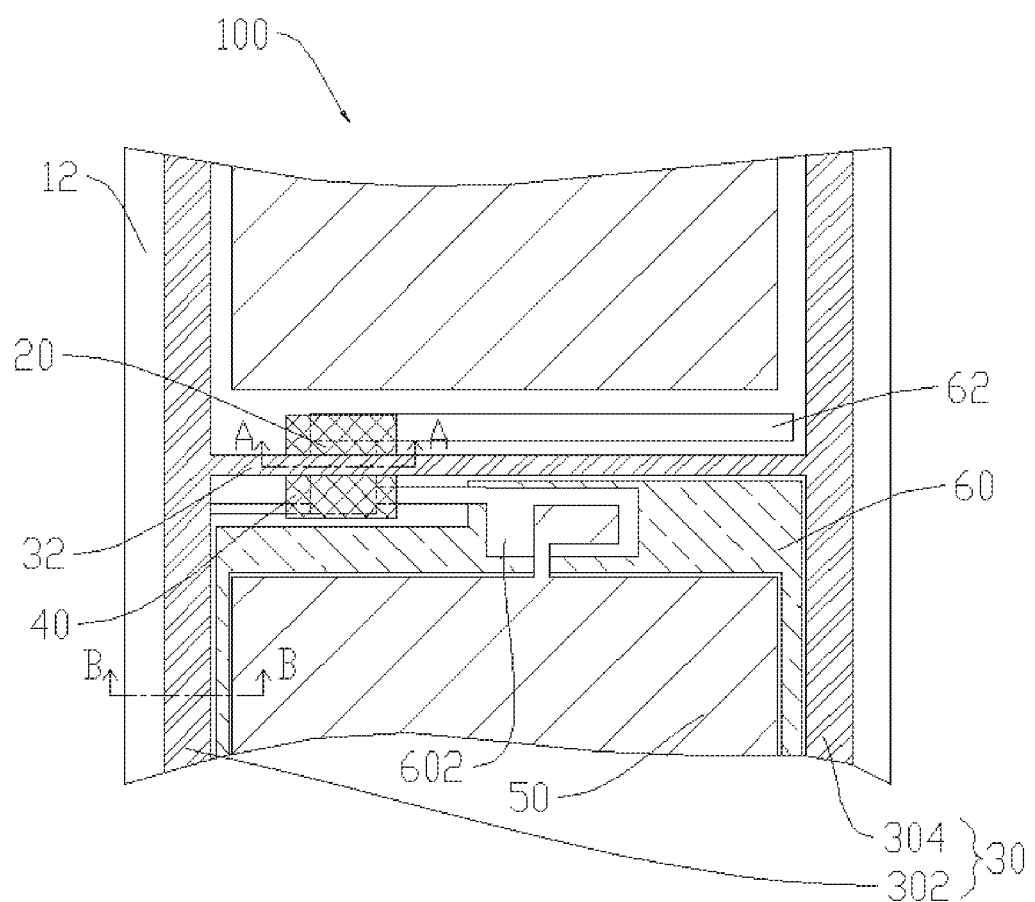
FIG. 1 is a structural schematic view of an array substrate according to an embodiment 1 of the disclosure.
Figure 2:
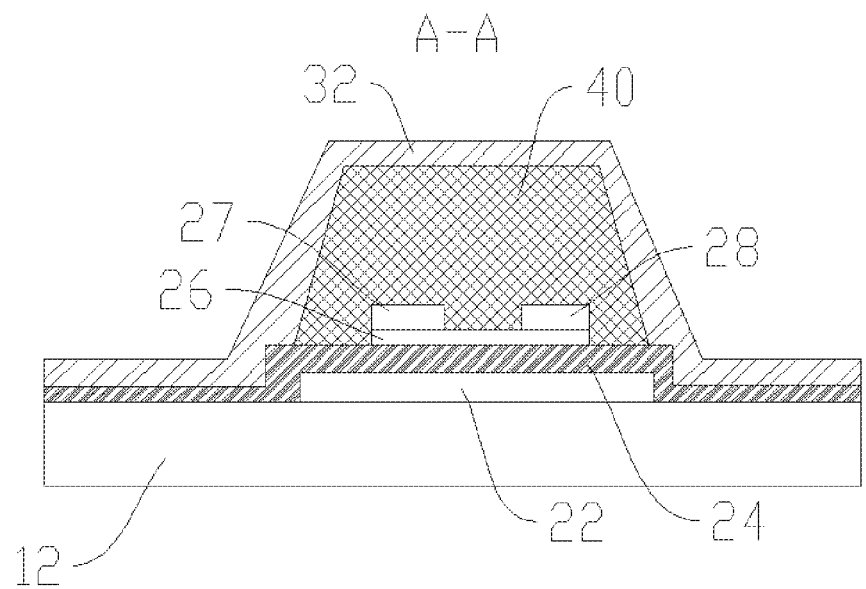
FIG. 2 is an A-A line cross-section schematic view of the array substrate according to the embodiment 1 of the disclosure.
Figure 3:
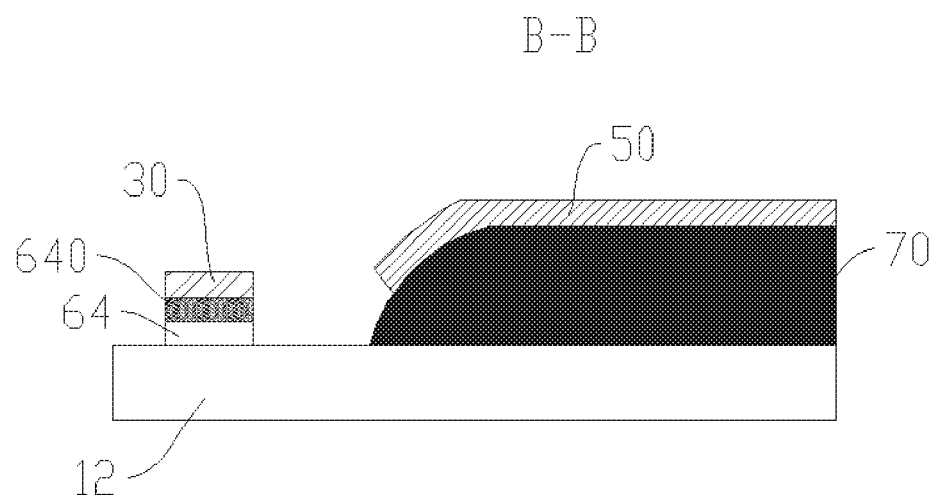
FIG. 3 is a B-B line cross-section schematic view of the array substrate according to the embodiment 1 of the disclosure.

Please refer to FIG. 1, FIG. 2 and FIG. 3. The embodiment of this disclosure provides an array substrate 100 comprises a first substrate 12, a thin film transistor 20, a data line 64, a scan line 62 and a pixel electrode 50. In other embodiment, the array substrate 100 is applied to a PSVA module liquid crystal display panel 200. Specifically, please refer to FIG. 1, the thin film transistor 20, the data line 64, the scan line 62 and the pixel electrode 50 are formed on the first substrate 12. A grid 22 of the thin film transistor 20 is electrically connecting to the scan line 62, source 27 and drain 28 of the thin film transistor 20 are respectively connecting to the data line 64 and the pixel electrode 50. In this embodiment, the data line 64 and the scan line 62 are interval arranged, the thin film transistor 20 and the pixel electrode 50 are located in a pixel region surrounding by the scan line 62 and the data line 64. It is noted that, the data line 64 of the FIG. 1 is shielded by a shielding electrode 30. In another embodiment, the first substrate 12 is a flat substrate made by transparent material such as glass substrate or plastic substrate.

Specifically, please refer to FIG. 2. The thin film transistor 20 is stacking positioned on surface of the first substrate 12. The array substrate 100 further comprising a blocking element 40. The blocking element 40 is stacking positioned on the thin film transistor 20. In another embodiment, vertical projection of the blocking element 40 on the first substrate 12 is covering the thin film transistor 20. In this embodiment, the blocking element 40 could be a color resistance blocker 70, and also could be a structure formed by other insulating material and has a certain thickness.

Please refer to FIG. 1 and FIG. 3. The array substrate 100 further comprises a shielding electrode 30. The shielding electrode 30 is located on a lateral side of the data line 64 which away the first substrate 12, vertical projections of the shielding electrode 30 on the first substrate 12 is covering the data line 64. Further, the data line 64 is insulating with the shielding electrode 30. In another embodiment, the shielding electrode 30 is interval by the insulating layer 640. In this embodiment, shielding electrode 30 is strip-shaped, each of the shielding electrodes 30 is covering a data line 64 for reducing lateral light leakage of the curving liquid crystal display panel 200. In this embodiment, the shielding electrode 30 includes a first shielding electrode 302 and a second shielding electrode 304, the first shielding electrode 302 and the second shielding electrode 304 are respectively covering a data lines 64. The thin film transistor 20 is located between the first shielding electrode 302 and the second shielding electrode 304. Actually, multiple first shielding electrodes 302 and multiple second shielding electrodes 304 are interval arranged on the array substrate 100. FIG. 1 only illustrates a pair of the first shielding electrodes 302 and the second shielding electrodes 304.

Please refer to FIG. 1 and FIG. 2. The array substrate 100 further comprises a transverse electrode 32. Specifically, refer to FIG. 1. The transverse electrode 32 is a strip-shaped electrode, and connecting between the first shielding electrode 302 and the second shielding electrode 34. Further, each two adjacent shielding electrodes 30 on the array substrate 100 are connecting with a transverse electrode 32 such that each of the shielding electrodes 30 of the array substrate 100 are connecting to each other. Specifically, refer to FIG. 2. The transverse electrode 32 is located on a lateral side of the thin film transistor 20 which away the first substrate 12, and at least partial of the transverse electrode 32 is stacking positioned on the blocking element 40. In other embodiment, the transverse electrode 32 is strip-shaped electrode, for connecting the first shielding electrode 302 and the second shielding electrode 304 by shortest length. Transverse electrode 32 is extending to the surface of the blocking element 40 while pass the position of the thin film transistor 20, that the blocking element 40 enhances the vertical distance of the transverse electrode 32 of above the thin film transistor 20 and the thin film transistor 20. The transverse electrode 32 is connecting the first shielding electrode 302 and the second shielding electrode 304 for consistent potential between the first shielding electrode 302 and the second shielding electrode 304. While changing high/low potential signal of the data line 64, the effect of potential of the first shielding electrode 302 and the second shielding electrode 304 are covered on the data line 64 by the data line 64 is be reduced, the first shielding electrode 302 and the second shielding electrode 304 are normal working.

The blocking element 40 enhances height of part of the thin film transistor 20 which pass by the transverse electrode 32, enhanced the vertical distance between the transverse electrode 32 and the thin film transistor 20. It avoids effect between the transverse electrode 32 and the thin film transistor 20 such that stable connecting between the first shielding electrode 302 and the second shielding electrode 304, reduces effect of the high/low potential signal of the data line 64 to the first shielding electrode 302 and the second shielding electrode 304. Further, the transverse electrode 32 in the horizontal direction does not need to curve for avoiding the thin film transistor 20, so that horizontal distance between the transverse electrode 32 and the pixel electrode 50 is more far. It avoids the ITO residue of edge of the pixel electrode 50 contacting the transverse electrode 32 cause the pixel electrode 50 and the transverse electrode 32 be short-circuit, and not affect normal working of the pixel electrode 50, high productively yield, and saving produce costs.

In this embodiment, please refer to FIG. 2. The thin film transistor 20 includes a grid 22 and a grid insulating layer 24 are sequentially positioned on the first substrate 12. The grid insulating layer 24 is covering the grid 22, at least partial of the transverse electrode 32 is stacking positioned on the grid insulating layer 24, the grid insulating layer 24 is for interval the transverse electrode 32 and the grid 22. In this embodiment, the grid insulating layer 24 is separated the transverse electrode 32 and part of the blocking element 40 which is not covered by the grid 22, for avoiding the internal effect between the grid 22 and transverse electrode 32.

In this embodiment, please refer to FIG. 2. The thin film transistor 20 further comprises the source 27, the drain 28 and an active layer 26 is electrically connecting with the source 27 and the drain 28. The source 27, the drain 28 and the active layer 26 is located in an enclosed space formed by the blocking element 40 and the grid insulating layer 24 for interval the transverse electrode 32 and the source 27, the drain 28 and the active layer 26. In this embodiment, on another aspect, the blocking element 40 also be the source 27, the drain 28 and the insulating material of surface of the active layer 26 for separating the transverse electrode 32 and the other structures to the source 27, the drain 28 and the active layer 26.

In this embodiment, please refer to FIG. 1. The array substrate 100 further comprises an auxiliary electrode 60 positioned on the first substrate 12, at least partial of vertical projection of the auxiliary electrode 60 on the first substrate 12 is located between the data line 64 and the pixel electrode 50, and the auxiliary electrode 60 is for decreasing effect of the pixel electrode 50 by the data line 60. In another embodiment, the array substrate 100 further comprises a transition conducting layer 602 connecting with the pixel electrode 50 and the source 27 or the drain 28 of the thin film transistor 20, the at least partial of the auxiliary electrode 60 is facing to the transition conducting layer 602 for forming a storage capacitor.

Please refer to FIG. 1. In another embodiment, the vertical projection of the transverse electrode 32 on the first substrate 12 without intersecting the scan line 62 and the auxiliary electrode 60. Specifically, partial of the transverse electrode 32 is located between the scan line 62 and the auxiliary electrode 60 such that avoids effect between the transverse electrode 32 and the scan line 62, auxiliary electrode 60.

The blocking element 40 enhances height of part of the thin film transistor 20 which pass by the transverse electrode 32, enhanced the vertical distance between the transverse electrode 32 and the thin film transistor 20. It avoids effect between the transverse electrode 32 and the thin film transistor 20 such that stable connecting between the shielding electrodes 30, reduces effect of the high/low potential signal of the data line 64 to the shielding electrode 30. Further, the transverse electrode 32 in the horizontal direction does not need to curve for avoiding the thin film transistor 20, so that horizontal distance between the transverse electrode 32 and the pixel electrode 50 is more far. It avoids the ITO residue of edge of the pixel electrode 50 contacting the transverse electrode 32 causes the pixel electrode 50 and the transverse electrode 32 be short-circuit, and not affect normal working of the pixel electrode 50, high productively yield, and saving produce costs.

Figure 4:
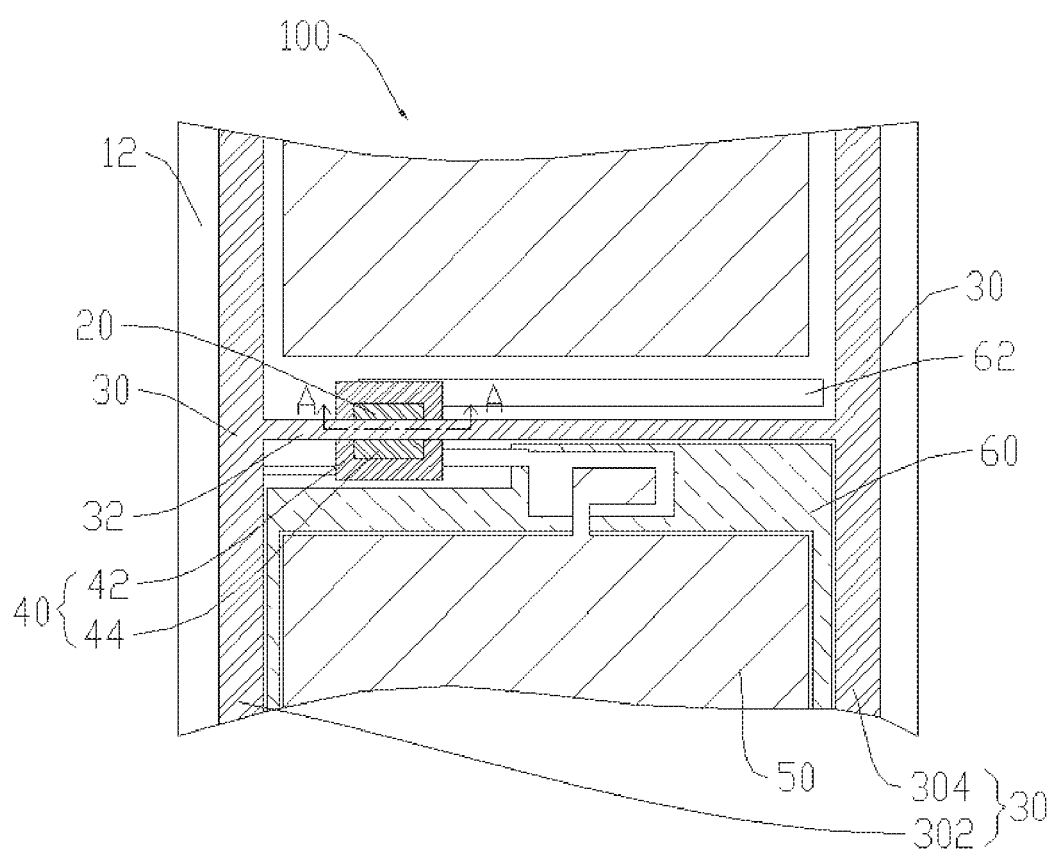
FIG. 4 is a structural schematic view of an array substrate according to an embodiment 2 of the disclosure.
Figure 5:
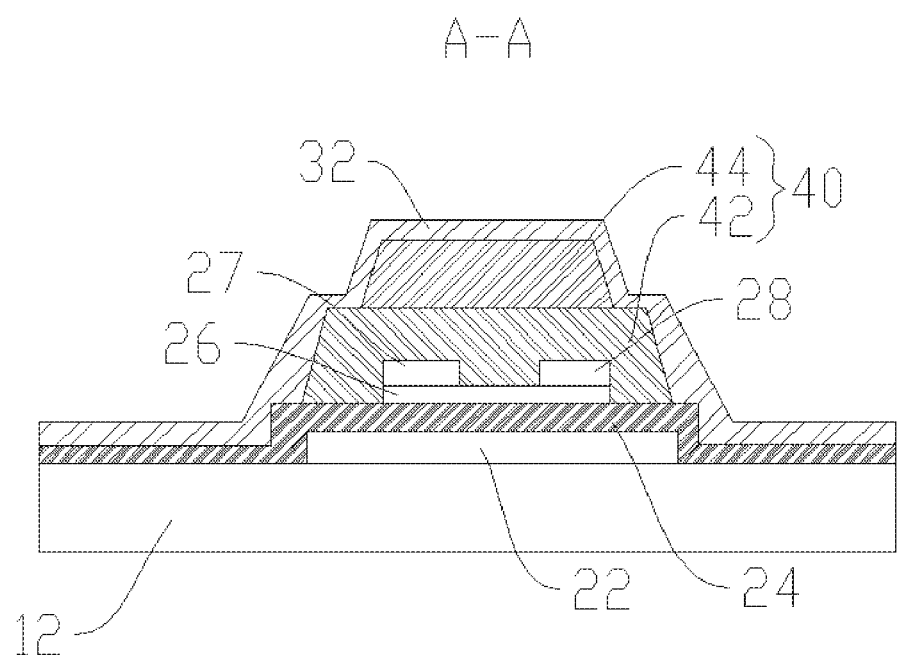
FIG. 5 is an A-A line cross-section schematic view of the array substrate according to the embodiment 2 of the disclosure.

Please refer to FIG. 4 and FIG. 5. The embodiment 2 of this disclosure provides an array substrate 100. The difference between the embodiment 2 and the embodiment 1 which is the blocking element 40 is at least a layer of color resistance blocker 70. In this embodiment, the array substrate 100 is Color Filter on Array (COA) substrate. Specifically, the color resistance blocker 70 for forming color image which is positioned on the first substrate 12, and the color resistance blocker 70 is positioned between the pixel electrode 50 and the first substrate 12. While forming the color resistance blockers 70, part of the color resistance blockers 70 are formed on surface of the first substrate 12 for imaging color of image, another part of the color resistance blockers 70 are positioned on the thin film transistor 20 to form the blocking element 40. It does need to add other process for forming blocking element 40, saving produce cost. In this embodiment, the blocking element 40 is stacked by at least a layer of color resistance blocker 70.

Please refer to FIG. 5. In this embodiment, the blocking element 40 comprises a first color resistance blocker 42 and a second color resistance blocker 44. The first color resistance blocker 42 and the second color resistance blocker 44 are sequentially stacking positioned on the thin film transistor 20, size of vertical projection of the first color resistance blocker 42 on the first substrate 12 is larger than the second color resistance blocker 44. In this embodiment, the first color resistance blocker 42 is red color resistance blocker, the second color resistance blocker 44 is blue color resistance blocker. In another embodiment, the first color resistance blocker 42 and the second color resistance blocker 44 also could be other difference color's color resistance blockers. In this embodiment, size of vertical projection of the color resistance blocker 42 on the first substrate 12 is larger than the second color resistance blocker 44. In other words, stacking two of difference size color resistance blockers 70 for forming a step-shaped blocking element 40. On one hand, the structure could keep enhance entire structure stable of the blocking element 40. On the other hand, height of the color resistance blocker 70 (the first color resistance blockers 42 or the second color resistance blockers 43) is lower so that fever to extend along the blocking element 40 to the transverse electrode 32. It avoids excessive rise of the blocking element 40 causes easily broken while extending along surface of the blocking element 40 to the transverse electrode 32, enhances manufacture produce yield of the transverse electrode 32.

In this embodiment, height of the first color resistance blocker 42 is larger than the second color resistance blocker 44. It is use for keep entire structure stable of the blocking element 40.

The blocking element 40 enhances height of part of the thin film transistor 20 which pass by the transverse electrode 32, enhanced the vertical distance between the transverse electrode 32 and the thin film transistor 20. It avoids effect between the transverse electrode 32 and the thin film transistor 20 such that stable connecting between the shielding electrodes 30, reduces effect of the high/low potential signal of the data line 64 to the shielding electrode 30. Further, the transverse electrode 32 on the horizontal direction does not need to curve for avoiding the thin film transistor 20, so that horizontal distance between the transverse electrode 32 and the pixel electrode 50 is more far. It avoids the ITO residue of edge of the pixel electrode 50 contacting the transverse electrode 32 causes the pixel electrode 50 and the transverse electrode 32 be short-circuit, and not affect normal working of the pixel electrode 50, high productively yield, and saving produce costs.

Figure 6:
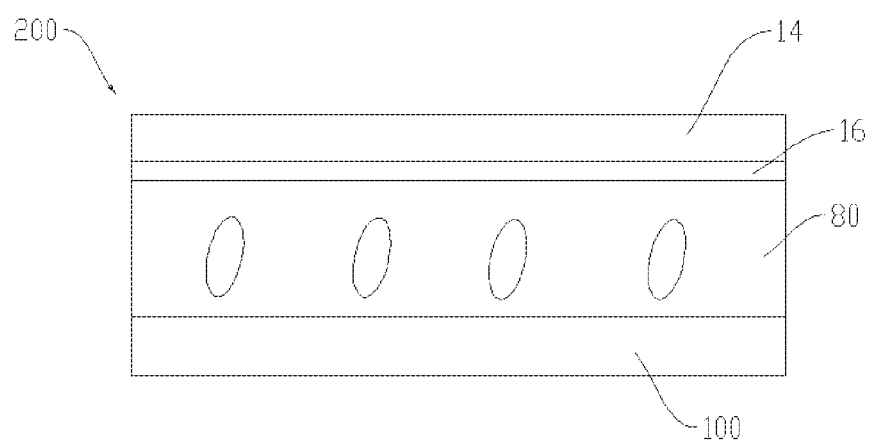
FIG. 6 is a cross-section schematic view of a liquid crystal display panel according to an embodiment of the disclosure.

Please refer to FIG. 6. The embodiment of this disclosure provides a liquid crystal display panel 200 comprising a second substrate 14, a common electrode 16, a liquid crystal layer 80 and an array substrate 100 provided in this embodiment. The second substrate 14 is correspondingly positioned to the first substrate 12, the common electrode 16 is positioned on a surface of the second substrate 14 which facing to the first substrate 12, the common electrode 16 is electrically connecting to the shielding electrode 30 (the first shielding electrode 302 and the second shielding electrode 304). The liquid crystal layer 80 is positioned between the pixel electrode 50 and the common electrode 60, and changing liquid crystal molecular deflection of the liquid crystal layer 80 according to voltage difference between the pixel electrode 50 and the common electrode 16. In this embodiment, the liquid crystal display panel 200 could be a curving display panel.

Figure 7:
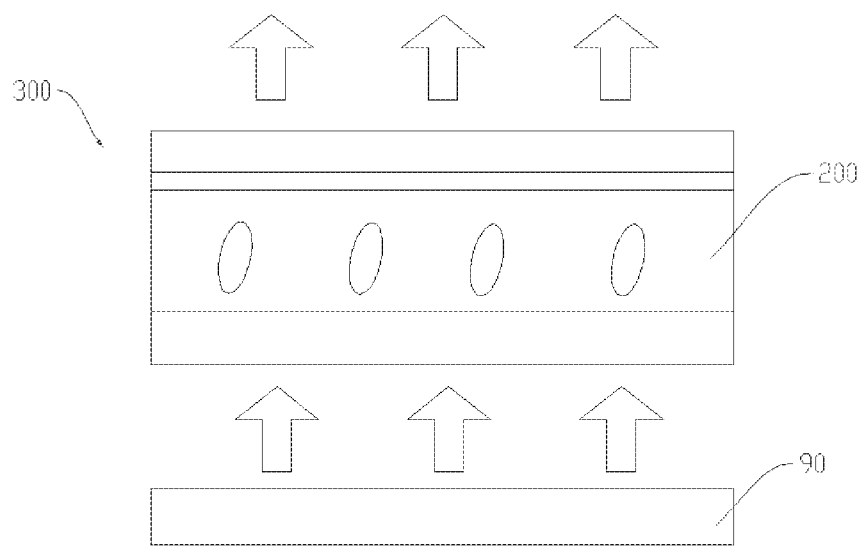
FIG. 7 is a structural schematic view of a liquid crystal display apparatus according to an embodiment of the disclosure.

Please refer to FIG. 7. The embodiment of this disclosure further provides a liquid crystal display apparatus 300 comprises a backlight module 90 and a liquid crystal display panel 200 of the embodiment in the disclosure. The backlight module 90 is positioned on a lateral side of non-display surface of the liquid crystal display panel 200 for providing back light source to display image of liquid crystal display panel 200. In another embodiment, the liquid crystal display apparatus 300 could be a curving display apparatus 300. In this embodiment, the liquid crystal display apparatus 300 is television, display device, mobile phone, tablet computer, notebook and so on.

The blocking element 40 enhances height of part of the thin film transistor 20 which pass by the transverse electrode 32, enhanced the vertical distance between the transverse electrode 32 and the thin film transistor 20. It avoids effect between the transverse electrode 32 and the thin film transistor 20 such that stable connecting between the shielding electrodes 30, reduces effect of the high/low potential signal of the data line 64 to the shielding electrodes 30. Further, the transverse electrode 32 on the horizontal direction does not need to curve for avoiding the thin film transistor 20, so that horizontal distance between the transverse electrode 32 and the pixel electrode 50 is more far. It avoids the ITO residue of edge of the pixel electrode 50 contacting the transverse electrode 32 causes the pixel electrode 50 and the transverse electrode 32 be short-circuit, and not affect normal working of the pixel electrode 50, high productively yield, and saving produce costs.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. An array substrate, comprising
   a first substrate;
   a thin film transistor and a data line are positioned on the first substrate, the data line electrically connecting with a source or a drain of the thin film transistor;
   a blocking element stacking positioned on the thin film transistor;
   a first shielding electrode and a second shielding electrode located on a lateral side of the data line which is away from the first substrate, vertical projections of the first shielding electrode and the second shielding electrode on the first substrate are respectively covering the data lines, the thin film transistor positioned between the first shielding electrode and the second shielding electrode; and
   a transverse electrode connecting between the first shielding electrode and the second shielding electrode, the transverse electrode is located on a lateral side of the thin film transistor which is away from the first substrate, and at least partial of the transverse electrode is stacking positioned on the blocking element.

2. The array substrate according to claim 1, wherein the array substrate further comprises color resistance blockers, part of the color resistance blockers are formed on surface of the first substrate for imaging color of image, part of the color resistance blockers are stacking positioned on the thin film transistor to form the color resistance blocker.

3. The array substrate according to claim 2, wherein the blocking element comprises a first color resistance blocker and a second color resistance blocker, the first color resistance blocker and the second color resistance blocker are sequentially stacking positioned on the thin film transistor, vertical projection of the first color resistance blocker on the first substrate is larger than the second color resistance blocker.

4. The array substrate according to claim 3, wherein height of the first color resistance blocker is larger than the second color resistance blocker.

5. The array substrate according to claim 1, wherein the array substrate further comprising an auxiliary electrode and a pixel electrode are positioned on the first substrate, at least partial of vertical projection of the auxiliary electrode on the first substrate is located between the data line and the pixel electrode, and the auxiliary electrode is for decreasing effect of the pixel electrode by the data line.

6. The array substrate according to claim 5, wherein the thin film transistor comprising a scan line positioned on the first substrate, vertical projection of the transverse electrode on the first substrate without intersecting the scan line and the auxiliary electrode.

7. The array substrate according to claim 1, wherein the thin film transistor comprising a grid and a grid insulating layer are sequentially positioned on the first substrate, the grid insulating layer is covering the grid, at least partial of the transverse electrode is stacking positioned on the grid insulating layer, the grid insulating layer is for interval the transverse electrode and the grid.

8. The array substrate according to claim 7, wherein the thin film transistor further comprising the source, the drain and an active layer electrically connecting with the source and the drain, the source, the drain and the active layer is located in an enclosed space formed by the blocking element and the grid insulating layer for interval the transverse electrode and the source, the drain and the active layer.

9. A liquid crystal display panel, comprising a second substrate, a common electrode, a liquid crystal layer and an array substrate, the array substrate comprising
   a first substrate;
   a thin film transistor and a data line positioned are on the first substrate, the data line electrically connecting with a source or a drain of the thin film transistor;
   a blocking element stacking positioned on the thin film transistor;
   a first shielding electrode and a second shielding electrode located on a lateral side of the data line which is away from the first substrate, vertical projections of the first shielding electrode and the second shielding electrode on the first substrate are respectively covering the data lines, the thin film transistor positioned between the first shielding electrode and the second shielding electrode;
   a transverse electrode connecting between the first shielding electrode and the second shielding electrode, the transverse electrode located on a lateral side of the thin film transistor which is away from the first substrate, and at least partial of the transverse electrode is stacking positioned on the blocking element;
   wherein the second substrate is correspondingly positioned to the first substrate, the common electrode is positioned on a surface of the second substrate which is facing to the first substrate, the common electrode is electrically connecting to the first shielding electrode and the second shielding electrode, the liquid crystal layer is positioned between the pixel electrode and the common electrode, and changing liquid crystal molecular deflection of the liquid crystal layer according to voltage difference between the pixel electrode and the common electrode.

10. The liquid crystal display panel according to claim 9, wherein the array substrate further comprises color resistance blockers, part of the color resistance blockers are formed on surface of the first substrate for imaging color of image, part of the color resistance blockers are stacking positioned on the thin film transistor to form the color resistance blocker.

11. The liquid crystal display panel according to claim 10, wherein the blocking element comprises a first color resistance blocker and a second color resistance blocker, the first color resistance blocker and the second color resistance blocker are sequentially stacking positioned on the thin film transistor, vertical projection of the first color resistance blocker on the first substrate is larger than the second color resistance blocker.

12. The liquid crystal display panel according to claim 11, wherein height of the first color resistance blocker is larger than the second color resistance blocker.

13. The liquid crystal display panel according to claim 9, wherein the array substrate further comprising an auxiliary electrode and a pixel electrode are positioned on the first substrate, at least partial of vertical projection of the auxiliary electrode on the first substrate is located between the data line and the pixel electrode, and the auxiliary electrode is for decreasing effect of the pixel electrode by the data line.

14. The liquid crystal display panel according to claim 13, wherein the thin film transistor comprising a scan line positioned on the first substrate, vertical projection of the transverse electrode on the first substrate without intersecting the scan line and the auxiliary electrode.

15. The liquid crystal display panel according to claim 9, wherein the thin film transistor comprising a grid and a grid insulating layer are sequentially positioned on the first substrate, the grid insulating layer is covering the grid, at least partial of the transverse electrode is stacking positioned on the grid insulating layer, the grid insulating layer is for interval the transverse electrode and the grid.

16. The liquid crystal display panel according to claim 15, wherein the thin film transistor further comprising the source, the drain and an active layer electrically connecting with the source and the drain, the source, the drain and the active layer is located in an enclosed space formed by the blocking element and the grid insulating layer for interval the transverse electrode and the source, the drain and the active layer.

17. A liquid crystal display apparatus, comprising a backlight module and a liquid crystal display panel according to claim 9, the backlight module is positioned on a side of non-display surface of the liquid crystal display panel for providing backlight source to display image on the liquid crystal display panel.

* * * * *